US010985521B2

(12) United States Patent
Watanabe et al.

(10) Patent No.: US 10,985,521 B2
(45) Date of Patent: Apr. 20, 2021

(54) RIDGE WAVEGUIDE LASER DEVICE

(71) Applicant: MITSUBISHI ELECTRIC CORPORATION, Tokyo (JP)

(72) Inventors: Yojiro Watanabe, Tokyo (JP); Takayuki Yanagisawa, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 278 days.

(21) Appl. No.: 16/319,758

(22) PCT Filed: Aug. 17, 2016

(86) PCT No.: PCT/JP2016/073987
§ 371 (c)(1),
(2) Date: Jan. 22, 2019

(87) PCT Pub. No.: WO2018/033970
PCT Pub. Date: Feb. 22, 2018

(65) Prior Publication Data
US 2020/0381887 A1 Dec. 3, 2020

(51) Int. Cl.
*H01S 3/30* (2006.01)
*H01S 3/10* (2006.01)
(Continued)

(52) U.S. Cl.
CPC ........ *H01S 3/10061* (2013.01); *H01S 3/0621* (2013.01); *H01S 3/0632* (2013.01);
(Continued)

(58) Field of Classification Search
CPC .. H01S 3/10061; H01S 3/0621; H01S 3/0637; H01S 3/1643; H01S 3/175;
(Continued)

(56) References Cited

U.S. PATENT DOCUMENTS 6,157,765 A * 12/2000 Bruce ................ G02B 6/132
385/129
2003/0161375 A1 8/2003 Filgas et al.
(Continued)

FOREIGN PATENT DOCUMENTS

CN 102318151 A 1/2012
EP 3089287 A1 11/2016
(Continued)

OTHER PUBLICATIONS

Communication pursuant to Article 94(3) EPC issued in corresponding European Application No. 16 913 499.6 dated Jun. 8, 2020.
(Continued)

*Primary Examiner* — Kinam Park
(74) *Attorney, Agent, or Firm* — Birch, Stewart, Kolasch & Birch, LLP

(57) ABSTRACT

A problem with a conventional waveguide type laser device is that in the case in which an isotropic laser medium is used for a core, linearly polarized light is not provided. A ridge waveguide laser device of the present disclosure includes: a substrate; a core joined to the substrate and having a laser medium, the core having a refractive index higher than that of the substrate; and a cladding joined to the core, constituting a ridge waveguide together with the core, and made from a birefringent material having ordinary and extraordinary refractive indices lower than the refractive index of the core, the ordinary and extraordinary refractive indices being different.

5 Claims, 5 Drawing Sheets

(51) Int. Cl.
*H01S 3/06* (2006.01)
*H01S 3/063* (2006.01)
*H01S 3/08* (2006.01)
*H01S 3/16* (2006.01)
*H01S 3/17* (2006.01)

(52) U.S. Cl.
CPC ........ *H01S 3/0637* (2013.01); *H01S 3/08036* (2013.01); *H01S 3/0625* (2013.01); *H01S 3/1643* (2013.01); *H01S 3/175* (2013.01)

(58) Field of Classification Search
CPC ...... H01S 3/063; H01S 3/0632; H01S 3/0625; H01S 3/08036
See application file for complete search history.

(56) References Cited

U.S. PATENT DOCUMENTS

| | | | | |
|---|---|---|---|---|
| 2007/0297737 | A1* | 12/2007 | Hashimoto | G02B 6/126 385/129 |
| 2010/0046886 | A1* | 2/2010 | Doerr | G02B 6/105 385/27 |
| 2010/0189151 | A1* | 7/2010 | Yanagisawa | H01S 3/0632 372/45.013 |
| 2011/0243493 | A1* | 10/2011 | Kondou | G02B 6/126 385/11 |
| 2016/0301179 | A1 | 10/2016 | Watanabe et al. | |
| 2017/0047706 | A1* | 2/2017 | Watanabe | G02B 6/4293 |

FOREIGN PATENT DOCUMENTS

| | | |
|---|---|---|
| JP | 10-123343 A | 5/1998 |
| JP | 10-307225 A | 11/1998 |
| JP | 11-352348 A | 12/1999 |
| JP | 2007-333756 A | 12/2007 |
| JP | 2011-209629 A | 10/2011 |
| WO | WO 2009/016703 A1 | 2/2009 |
| WO | WO 2010/134178 A1 | 11/2010 |
| WO | WO 2015/097869 A1 | 7/2015 |
| WO | WO 2015/182017 A1 | 12/2015 |

OTHER PUBLICATIONS

Chinese Office Action and Search Report, dated Apr. 2, 2020, for Chinese Application No. 201680088081.2, with an English translation.

Chin et al., "High-Index-contrast waveguides and devices", Applied Optics, vol. 44, No. 15, May 20, 2005, pp. 3077-3086 (10 pages).

* cited by examiner

RIDGE WAVEGUIDE LASER DEVICE

TECHNICAL FIELD

The present disclosure relates to ridge waveguide laser devices.

BACKGROUND ART

Ridge waveguide laser devices have a structure in which claddings having a refractive index lower than that of a laser medium are joined to upper and lower surfaces which are a pair of flat surfaces of a core made of a thin flat plate-like laser medium extending in a propagation direction (traveling direction) of signal light. In addition, a cladding or both a cladding and the core include a ridge structure.

The core of a ridge waveguide laser amplifier can operate as a waveguide, and furthermore it yields a large gain even in a case in which a laser medium having a small stimulated emission cross section is used because the mode field formed by the waveguide is small and the excitation density is high.

Therefore, high efficient amplification and oscillation of signal light can be implemented.

A conventional waveguide disclosed in Patent Literature indicated below includes a birefringent waveguide layer, cladding layers disposed on upper and lower surfaces of the waveguide layer, and optical loss means for attenuating incident light disposed on an outer surface of each of the cladding layers, wherein the cladding layers have a refractive index higher than the ordinary refractive index (or extraordinary refractive index) of the waveguide layer or lower than the extraordinary refractive index (or ordinary refractive index) of the waveguide layer. The conventional waveguide separates TE light and TM light incident upon the waveguide layer by guiding one of the TE light and the TM light, and leaking the other one of them and attenuating the other one by using the optical loss means. As a result, a very good extinction ratio as a polarizer can be implemented in a structure which is easily processed.

CITATION LIST

Patent Literature

WO2010/134178

SUMMARY OF INVENTION

Technical Problem

Thus, for the conventional waveguide, its core needs to be made from birefringent material. Accordingly, although it is necessary sometimes to use an isotropic laser medium because of a requirement about wavelength or output, the conventional waveguide involves a problem in that linearly polarized light cannot be obtained when an isotropic laser medium is used.

Embodiments of the present disclosure have been made in order to solve the above-mentioned problem, and it is therefore an object of the embodiments to provide a ridge waveguide laser device that includes a core made of isotropic medium, can output laser light having a desired wavelength, and provides a high polarization extinction ratio.

Solution to Problem

According to the present disclosure, there is provided a ridge waveguide laser device including: a substrate; a core joined to the substrate and containing a laser medium, the core having a refractive index higher than that of the substrate; and a cladding joined to the core, constituting a ridge waveguide together with the core, and made from a birefringent material having ordinary and extraordinary refractive indices lower than the refractive index of the core, the ordinary and extraordinary refractive indices being different.

Advantageous Effects of Invention

According to the present disclosure, there is provided an advantage of increasing the polarization extinction ratio of signal light even when an isotropic medium is applied to the core in the waveguide.

DESCRIPTION OF EMBODIMENTS

Embodiment 1

Figure 1:
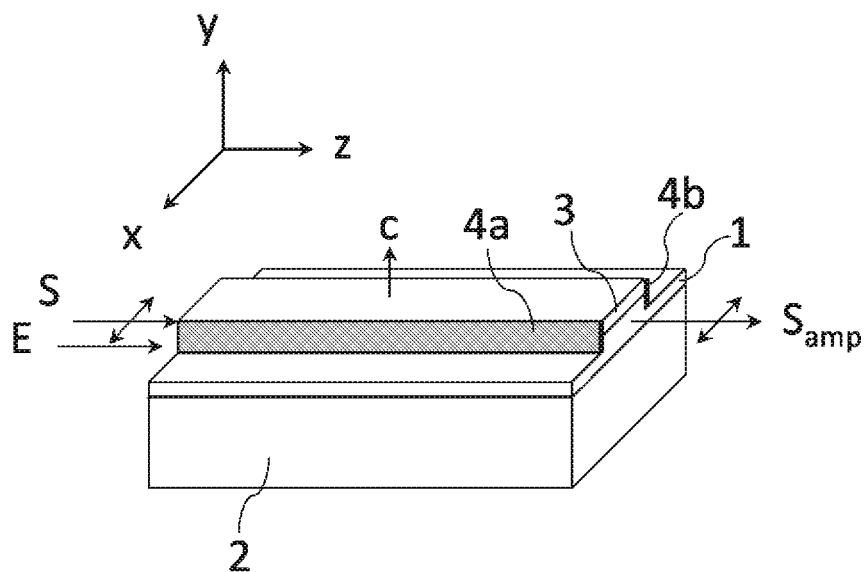
FIG. 1 is a perspective view showing an example of the structure of a ridge waveguide laser device according to Embodiment 1 of the present disclosure.

FIG. 1 is a perspective view showing an example of the structure of a ridge waveguide laser device according to Embodiment 1 of the present disclosure. In FIG. 1, S denotes signal light, $S_{amp}$ denotes amplified signal light, c denotes a crystallographic axis, and E denotes excitation light.

Figure 2:
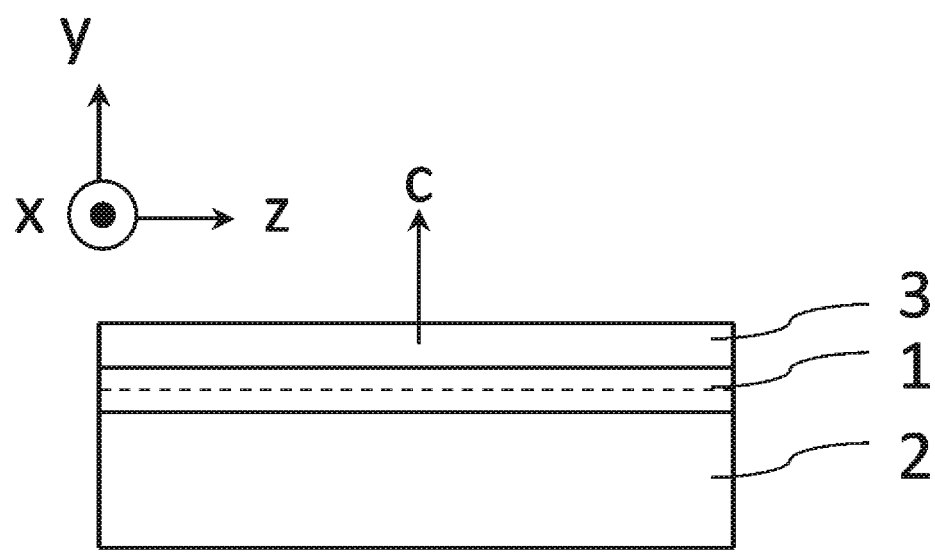
FIG. 2 is a view of a y-z plane of the ridge waveguide laser device according to Embodiment 1 of the present disclosure.

FIG. 2 is a view of a y-z plane of the ridge waveguide laser device according to Embodiment 1 of the present disclosure.

Figure 3:
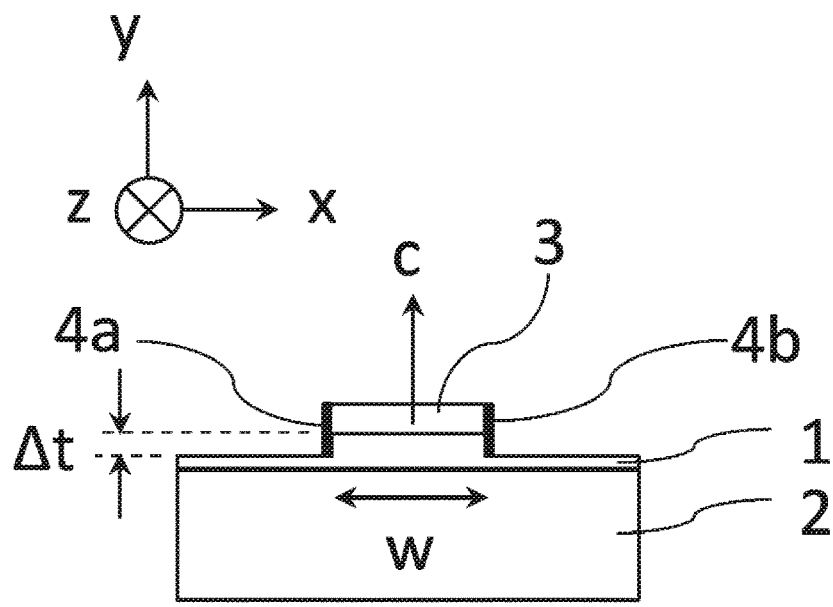
FIG. 3 is a view of an x-y plane of the ridge waveguide laser device according to Embodiment 1 of the present disclosure.

FIG. 3 is a view of an x-y plane of the ridge waveguide laser device according to Embodiment 1 of the present disclosure.

With reference to FIGS. 1 to 3, in a plane parallel to the upper and lower surfaces of a core 1, directions parallel to two perpendicular edges of the upper or lower surface are defined as an x-axis and a z-axis, and a direction perpendicular to both the x-axis and the z-axis is defined as a y-axis. Furthermore, a direction along the z-axis is defined as an optical axis of the excitation light E. The c axis of a cladding 3 is in a direction perpendicular to an x-z plane.

This ridge waveguide laser device includes the core 1, a substrate 2, the cladding 3, and optical loss providing portions 4a and 4b.

The core 1 is a flat plate-like core having a ridge structure portion and containing an isotropic laser medium. The ridge structure portion refers to a protruding portion in the shape of a hump. Examples of materials for fabricating the core 1 include Er:Phosphate glass, Er,Yb:Phosphate glass, Yb:Phosphate glass, Yb:YAG, Nd:YAG, Er:YAG, Er,Yb:YAG, Tm:YAG, Ho:YAG, Tm,Ho:YAG, and Pr:YAG.

The substrate 2 is made from a material having a refractive index lower than that of the core 1, and it is joined to a lower surface which is a flat surface of the core 1. Examples of materials of the substrate 2 include undoped glass and undoped YAG into which no active ions are doped, and the same material as that of the cladding 3. The substrate 2 may also be referred to as a lower cladding.

The cladding 3 is made from a birefringent material having different refractive indices in two polarization directions that are perpendicular to the optical axis, which is the propagation direction of the signal light S in the core 1. The cladding 3 is joined to an upper surface which is a flat surface of the core 1. For example, as the cladding 3, quartz, KTP, or the like is used.

Each of the optical loss providing portions 4a and 4b is provided in or on a side surface of the ridge structure portion to introduce loss to the laser light. For example, each of the optical loss providing portions 4a and 4b is provided by forming the side surface of the ridge structure portion of the core 1 into a roughened surface. The roughened surface has a surface roughness Ra=4 nm or more. Alternatively, each of the optical loss providing portions 4a and 4b can be provided by attaching a film for absorbing laser light to the side surface of the ridge structure portion.

The ridge structure portion can be provided by forming the core 1 into a hump shape. Alternatively, after the cladding 3 is joined to a part of the core 1 in the shape of a flat plate, a structure having a hump shape may be formed using both the core 1 and the cladding 3, as will be explained later.

Here, relationships among the refractive index of the core 1 and the refractive indices of the cladding 3 will be explained.

Let the refractive index of the core 1 be denoted by $n_c$, let the extraordinary refractive index of the cladding 3 in a direction of the c axis be denoted by $n_e$, and let the ordinary refractive index of the cladding 3 in a direction perpendicular to the c axis be denoted by $n_o$. In this case the refractive index n, satisfies Inequalities (1) or (2) below.

[Inequalities 1]

$$n_o < n_e n_c \quad (1)$$

[Inequalities 2]

$$n_e < n_o < n_c \quad (2)$$

In addition to satisfying Ineqs. (1) or (2), the core 1 is made from material such that the refractive index $n_c$ of the core 1 satisfies Inequality (3) below in relation to the refractive index $n_s$ of the substrate 2.

[Inequality 3]

$$n_s < n_c \quad (3)$$

Hereafter, examples of combination of specific materials for the core 1 and the cladding 3 which satisfy the relationships shown by Ineqs. (1) will be shown. Note that each combination of specific materials is only an example, and that any other combination is possible as long as it satisfies the relationships shown by the Ineqs. (1).

Combination 1
Core 1→Er:Phosphate glass, Er,Yb:Phosphate glass, or Yb:Phosphate glass.
Cladding 3→Quartz
Combination 2
Core 1→Yb:YAG, Nd:YAG, Er:YAG, Er,Yb:YAG, Tm:YAG,
Ho:YAG, Tm,Ho:YAG, or Pr:YAG.
Cladding 3→KTP Hereafter, a case in which the material of the core 1 is Er:Phosphate glass and the material of the cladding 3 is quartz will be explained as an example. In this case, the core 1 has a refractive index $n_c$ ranging from 1.515 to 1.541 at a wavelength of 1,535 nm, and it is assumed hereafter that the refractive index is 1.541.

Furthermore, the refractive index $n_e$ for an extraordinary ray (c axis) of the cladding 3 is approximately 1.536 and the refractive index $n_o$ for an ordinary ray of the cladding is approximately 1.528 at the wavelength of 1,535 nm.

Next, the operation of the ridge waveguide laser device according to Embodiment 1 of the present disclosure will be explained.

Because the flat plate-like core 1 is comprised of a laser medium, when excitation light E is incident from a facet the flat plate-like core 1 absorbs the excitation light E to form a state of population inversion. Furthermore, the core 1 generates a gain by forming the population inversion state.

When signal light S, which is laser light, is incident on the core 1 in the situation where the core 1 forms the population inversion state, the signal light is amplified with the gain. Hereafter, although an explanation will be made by assuming that the incident signal light is x-polarized light, the incident signal light can be alternatively y-polarized light.

Since a stress may occur inside the ridge waveguide and therefore an unexpected refractive index distribution occurs inside the ridge waveguide in a process of manufacturing the waveguide or when the ridge waveguide is joined to a heat sink, the polarization of the incident signal light S is not held even though x-polarized light is incident upon the core 1. In this case, a y-polarized component is generated inside the core 1.

Figure 4:
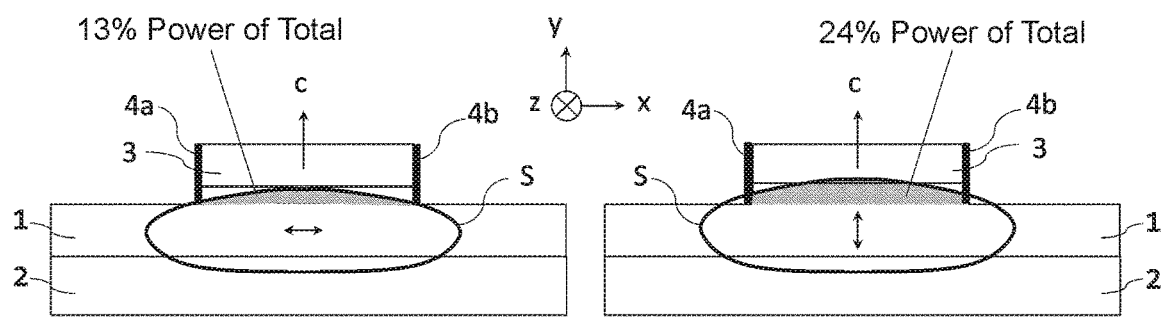
FIG. 4 is a view showing light intensity distributions of the ridge waveguide laser device according to Embodiment 1 of the present disclosure.

FIG. 4 is a view showing light intensity distributions of the ridge waveguide laser device according to Embodiment 1 of the present disclosure. Double arrows in FIG. 4 each denote a polarization direction.

In the case of the above-mentioned materials, because the refractive index for both x-polarized light and y-polarized light of the core 1 is 1.541, the refractive index for x-polarized light of the cladding 3 is 1.528, and the refractive index for y-polarized light of the cladding 3 is 1.536, the refractive index difference between the core 1 and the cladding 3 for the y-polarized light is smaller than that for the x-polarized light.

Therefore, because a smaller refractive index difference between the core and the cladding is provided for the y-polarized light, power distribution to the cladding 3 is larger for the y-polarized light than for the x-polarized light. Therefore, there occurs a difference in the power distribution along a direction of the y-axis between the x-polarized light and the y-polarized light.

Suppose a case in which the thickness of the ridge structure portion of the core 1 is 10 µm, the thickness of a portion other than the ridge structure portion of the core 1 (the thickness of a flat portion) is 8 µm, and the ridge width of the ridge structure portion is approximately 40 µm. In this case, as shown in FIG. 4, the ratio of the power in the ridge structure portion to the total power is 24% for the y-polarized light, while it is 13% for the x-polarized light.

Thus, if the c axis of the cladding 3 is perpendicular to the x-z plane, and if the relationship among refractive indices of the core 1 and cladding 3 satisfies Ineqs. (1), the ridge waveguide laser device can cause a difference between the light intensity distribution of x-polarized light and the light intensity distribution of y-polarized light in the ridge structure portion.

Because the optical loss providing portions 4a and 4b are provided in or on the side surfaces of the ridge structure portion, the losses introduced by the optical loss providing portions 4a and 4b differ for the x-polarized light and the y-polarized light. In this example, because the power in the ridge structure portion is larger for the y-polarized light, the loss is larger for the y-polarized light.

Note that providing no optical loss providing portions 4a and 4b does not necessarily mean that no loss occurs at each boundary (side surface); loss occurs. As in the case in which the optical loss providing portions 4a and 4b are provided, the power in the ridge structure portion is larger for the y-polarized light. Therefore, when a loss occurs, the loss is larger for the y-polarized light. Furthermore, even if no loss occurs, because a small portion of the x-polarized light leaks into the cladding 3, that is, the spatial overlap with the core 1 providing the gain is greater for the x-polarized light. As a result, contribution to the energy stored and extracted from the core 1 is larger for the x-polarized light than for the y-polarized light, and therefore a higher gain for the x-polarized light than that for the y-polarized light can be provided and the polarization extinction ratio can be increased.

Therefore, because a y-polarized component having a large loss is amplified more difficultly compared with an x-polarized component, the polarization extinction ratio can be increased.

Next, a method for manufacturing the ridge waveguide laser device according to Embodiment 1 of the present disclosure will be explained.

First, a laser medium is cut to form a flat-shaped core 1, and then one of zx surfaces, out of upper and lower surfaces which are a pair of flat surfaces (zx surfaces), is ground.

Next, the substrate 2 made from a material satisfying Ineq. (3) is joined to the ground zx surface of the core 1. The joining of the substrate 2 to the zx surface of the core 1 is achieved by joining the substrate directly to the zx surface by using a method, such as optical contact, surface activated bonding, or diffusion bonding. Alternatively, the substrate may be joined to the zx surface with a buffer layer being sandwiched between them, the buffer layer being such a one as will reduce the difference in thermal expansion between the core 1 and the substrate 2.

Next, grind the other zx surface (upper surface) which has not been ground, out of the zx surfaces of the core 1, to adjust the thickness of the core 1 to have a predetermined thickness.

Next, the cladding 3 is joined to the zx surface (upper surface) of the core 1 to which the substrate 2 is not joined. Note that the cladding 3 is joined to the zx surface (upper surface) of the core 1 in such a manner that the c axis extends along a direction as shown in FIGS. 1 to 3.

Next, a resist is patterned, and then etching is performed to create the ridge structure portion. At this time, generally, the side surfaces of the ridge structure portion which correspond to the optical loss providing portions 4a and 4b tend to be rough if the setting of conditions is insufficient. In this case, the side surfaces of the ridge structure portion are made to have roughened surfaces, and therefore they scatter light in the ridge structure portion and introduce loss to the light. Thus, generally, the side surfaces of the ridge structure portion serve as the optical loss providing portions 4a and 4b each introducing a loss to the light.

Note that concrete examples of a light source that supplies the excitation light to the ridge waveguide laser amplifier include, for example, a semiconductor laser, and a fiber laser and any other solid state laser.

As explained above, according to Embodiment 1, the cladding 3 is made from a birefringent material having different refractive indices for the two polarization directions that are perpendicular to the optical axis which is the propagation direction of the signal light within the core 1, wherein the refractive indices for the two polarized light rays are lower than the refractive index of the core 1. Therefore, a difference in light intensity distribution is provided in the ridge structure portion between the two polarized light rays. Therefore, there is provided an advantage of increasing the polarization extinction ratio of signal light even when an isotropic laser medium is used for the core 1.

Embodiment 2

Although in Embodiment 1, an example of the laser amplifier is shown, in Embodiment 2, an example of a laser oscillator will be shown.

Figure 5:
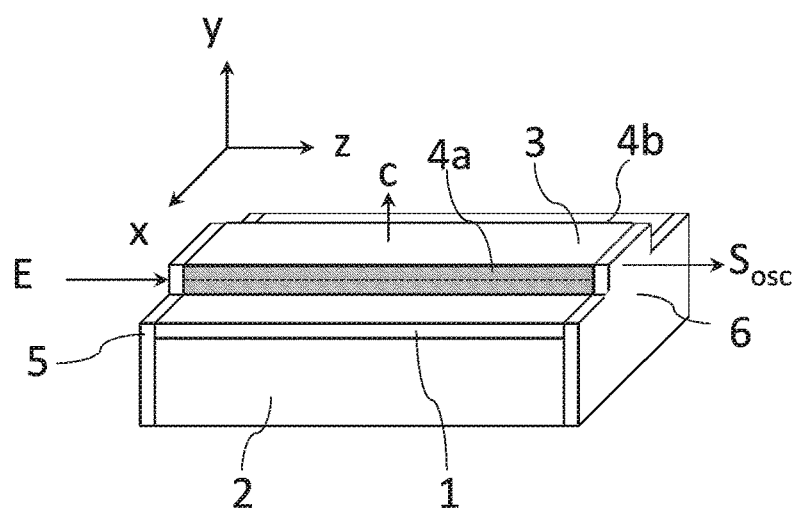
FIG. 5 is a perspective view showing an example of the structure of a ridge waveguide laser device according to Embodiment 2 of the present disclosure.

FIG. 5 is a perspective view showing a ridge waveguide laser device according to Embodiment 2 of the present disclosure.

Figure 6:
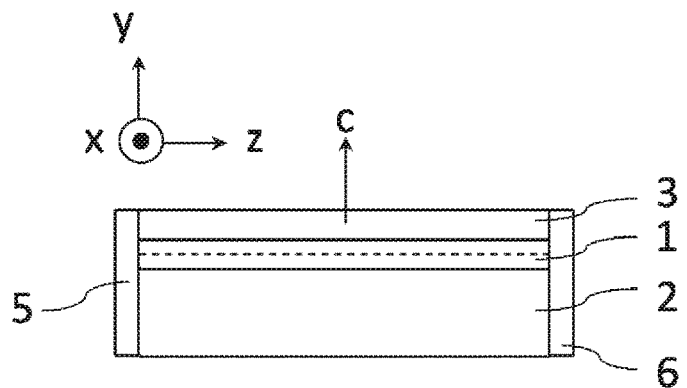
FIG. 6 is a view of a y-z plane of the ridge waveguide laser device according to Embodiment 2 of the present disclosure.

FIG. 6 is a view of a y-z plane in the ridge waveguide laser device according to Embodiment 2 of the present disclosure.

In FIGS. 5 and 6, the same reference symbols as those in FIG. 1 denote the same components or like components, and an explanation of the components will be omitted hereafter. In FIG. 5, $S_{osc}$ denotes oscillated signal light.

A coating 5 (an example of a reflection film) is formed as a film on an excitation light input facet, and has a high reflectivity for the signal light and a low reflectivity for the excitation light. For example, as the coating 5, a dielectric multilayer is used.

A coating 6 (an example of a partial reflection film) is formed on another facet opposite the excitation light input facet, has a property of reflecting part of the signal light, and has a high reflectivity for the excitation light. The coating 6 constitutes a resonator together with a core 1 and the coating 5. For example, as the coating 6, a dielectric multilayer is used.

Next, the operation of the ridge waveguide laser device according to Embodiment 2 of the present disclosure will be explained.

Excitation light E is incident upon the core 1 to generate signal light inside the core 1. The signal light generated inside the core 1 is reflected by the coatings 5 and 6, and laser oscillation occurs if an oscillation condition given by the following inequality is satisfied. Then, oscillation light $S_{osc}$ is outputted from the coating 6.

[Inequality 4]

$$2g_0 L \geq 2\alpha_s L - \ln(1-T) \tag{4}$$

Here, $g_0$ denotes the gain coefficient of a small signal generated in the core 1, and $\alpha_s$ denotes a cavity internal loss. The cavity internal loss is the sum of losses, such as a loss caused by scattering that occurs in the ridge waveguide between the coatings 5 and 6, a loss caused by absorption, a coupling loss on the facet of the ridge waveguide that is coated with the coating 5, a coupling loss on the facet of the ridge waveguide that is coated with the coating 6. L denotes the length of the ridge waveguide, and T denotes the transmittance of the oscillation light through the coating 6.

The intensity distributions of x-polarized light and the y-polarized light of the signal light generated inside are the same as those in the case of Embodiment 1, and there occurs a difference in the ratio of the power in the ridge structure portion to the total power between the x-polarized light and y-polarized light.

Then, because the losses which are introduced to the x-polarized and y-polarized light by optical loss providing portions 4a and 4b differ, the value of $\alpha_s$ in the above inequality differs according to the polarization direction. Therefore, oscillation occurs for the polarized light having a smaller loss, while oscillation for the other polarized light can be suppressed.

As is clear from the above explanation, according to Embodiment 2 of the present disclosure, because the cladding 3 is made from a birefringent material in which there is a difference between the refractive indices in the two polarization directions perpendicular to the optical axis which is the propagation direction of the signal light inside the core 1, and the refractive indices are lower than the refractive index of the core 1, and a structure is provided in which a difference is provided between the light intensity distributions of the two polarized light rays and there occurs a large loss for one of the polarized light rays, oscillation light $S_{osc}$ which is linearly polarized light can be outputted.

Embodiment 3

Although in Embodiment 1, the example in which the optical loss providing portions 4a and 4b are provided in or on the side surfaces of the ridge structure portion and a difference in loss is provided between two polarized light rays is shown, in Embodiment 3, an example in which a difference in loss is provided between two polarized light rays by filling the surroundings of a ridge structure portion with an optical material 7 having a refractive index between the refractive indices for ordinary and extraordinary rays of a cladding 3.

Figure 7:
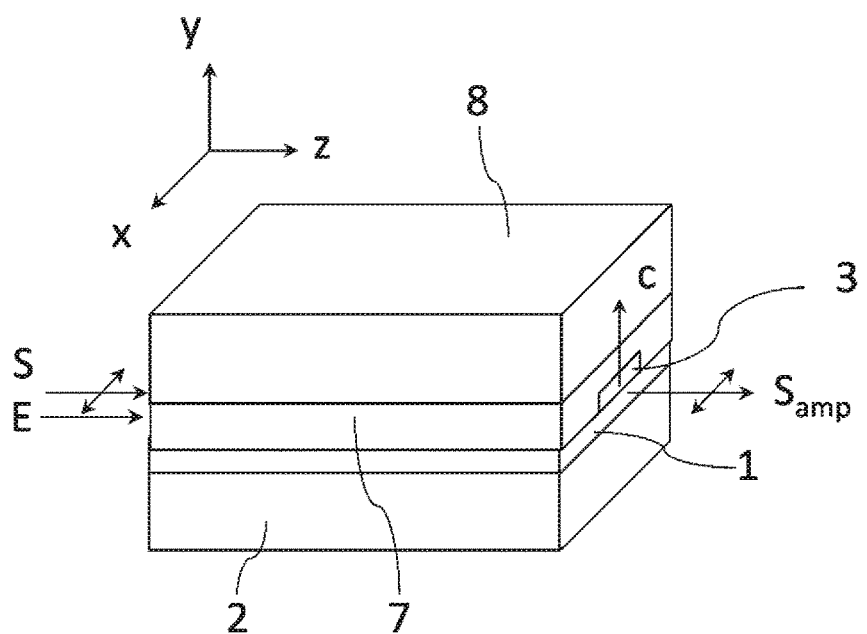
FIG. 7 is a perspective view showing an example of the structure of a ridge waveguide laser device according to Embodiment 3 of the present disclosure.

FIG. 7 is a perspective view showing a ridge waveguide laser device according to Embodiment 3 of the present disclosure.

Figure 8:
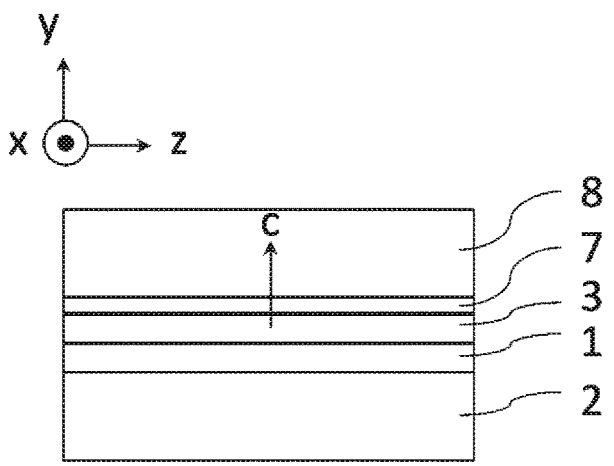
FIG. 8 is a view of a y-z plane of the ridge waveguide laser device according to Embodiment 3 of the present disclosure.

FIG. 8 is a view of a y-z plane in the ridge waveguide laser device according to Embodiment 3 of the present disclosure.

Figure 9:
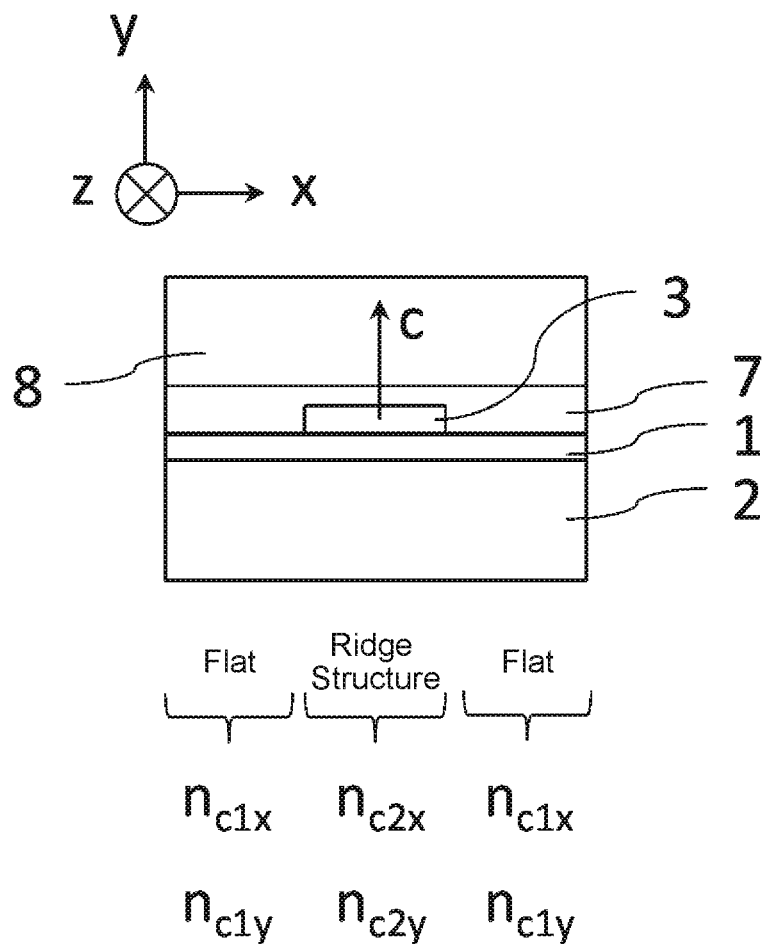
FIG. 9 is a view of an x-y plane of the ridge waveguide laser device according to Embodiment 3 of the present disclosure.

FIG. 9 is a view of an x-y plane in the ridge waveguide laser device according to Embodiment 3 of the present disclosure.

In FIGS. 7, 8, and 9, the same reference symbols as those in FIG. 1 denote the same components or like components, and an explanation of the components will be omitted hereafter.

The optical material 7 satisfies the following condition where the refractive index is denoted by $n_a$. The optical material 7 is joined to one or more flat portions on a core 1 of a ridge waveguide. The flat portion refers to a portion which is not a protruding portion in the ridge waveguide (see FIG. 9). Examples of the optical material 7 include, for example, a dielectric film and an adhesive that is optically usable.

[Inequalities 5]

$$n_o < n_a < n_e < n_c \tag{5}$$

or

[Inequalities 6]

$$n_e < n_a < n_o < n_c \tag{6}$$

A substrate 8 is a reinforcing substrate for preventing a droop of a facet at a time of grinding the facet of the ridge waveguide. For example, as the substrate 8, the same material as that of a substrate 2, glass, ceramic, crystal, or the like is used.

Next, the operation of the ridge waveguide laser device according to Embodiment 3 of the present disclosure will be explained.

As shown in FIG. 9, the equivalent refractive indices for the x-polarized and y-polarized light rays of the ridge structure portion in the ridge waveguide are denoted by $n_{c2x}$ and $n_{c2y}$, respectively, and the equivalent refractive indices for the x-polarized and y-polarized light rays of the flat portion in the ridge waveguide are denoted by $n_{c1x}$ and $n_{c1y}$, respectively.

Because $n_a < n_c$ under the condition shown by the Ineqs. (5), the relation in the equivalent refractive index between the ridge structure portion and the flat portion is as follows.

[Inequality 7]

$$n_{c2y} > n_{c1y} \tag{7}$$

[Inequality 8]

$$n_{c2x} < n_{c1x} \tag{8}$$

As shown in Ineq. (7), because the equivalent refractive index for the y-polarized light of the flat portion is lower than that of the ridge structure portion, the y-polarized light is coupled into waveguide modes to be confined in the ridge structure portion.

On the other hand, as shown in Ineq. (8), because the equivalent refractive index for the x-polarized light of the flat portion is higher than that of the ridge structure portion, the x-polarized light is coupled into radiation modes and is not confined.

Under the condition shown by Ineqs. (6), the relation in the equivalent refractive index between the ridge structure portion and the flat portion is as follows.

[Inequality 9]

$$n_{c2x} > n_{c1x} \tag{10}$$

[Inequality 10]

$$n_{c2y} < n_{cly} \quad (10)$$

In this case, the x-polarized light is coupled into waveguide modes, while the y-polarized light is coupled into radiation modes.

Thus, under the condition of Ineqs. (7) and (8) or of Ineqs. (9) and (10), either the x-polarized light or the y-polarized light cannot be confined in a direction of an x-axis, and therefore there occurs a difference in a propagation loss between the x-polarized light and the y-polarized light.

As is clear from the above explanation, according to Embodiment 3, because by joining the optical material 7 having a refractive index between the refractive indices for ordinary and extraordinary rays of the cladding 3 to the flat portion(s) of the ridge waveguide, the relation between the equivalent refractive index of the ridge structure portion and that of the flat portion is changed with respect to polarized light rays, thereby preventing one of the polarized light rays from being confined in the direction of the x-axis, signal light which is linearly polarized light can be outputted.

Although in Embodiment 3, the shape of the core 1 is a flat one, the core can be formed into a hump shape, like that of Embodiment 1.

Although the substrate 8 is shown in FIGS. 7 to 9, the substrate 8 is not indispensable. Providing the substrate 8, a droop of facet of the core 1 when grinding the facet can be prevented, as shown below.

Figure 10:
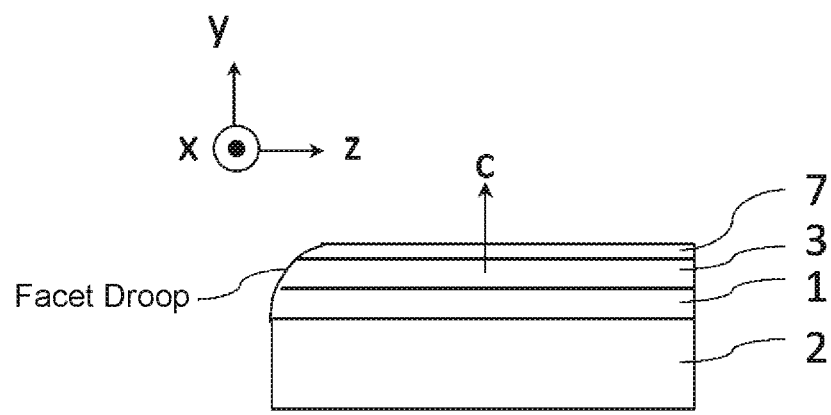
FIG. 10 is a view showing a droop of a facet which occurs in grinding a facet of a ridge waveguide laser device.

FIG. 10 is a view showing a droop of a facet of a ridge waveguide laser device when grinding the facet. In a case in which no substrate 8 is provided, a facet droop occurs because, for example, a thermal condition occurring at the time of grinding differs between an edge of the facet and a central part of the facet. When a facet droop occurs, an optical loss is caused.

Embodiment 4

Although in Embodiment 3, an example of the amplifier that provides a loss difference between x-polarized light and y-polarized light by joining the optical material 7 having a refractive index between the refractive indices for ordinary and extraordinary rays of the cladding 3 to the flat portion of the ridge waveguide is shown, in Embodiment 4, an example of an oscillator in that case will be explained.

Figure 11:
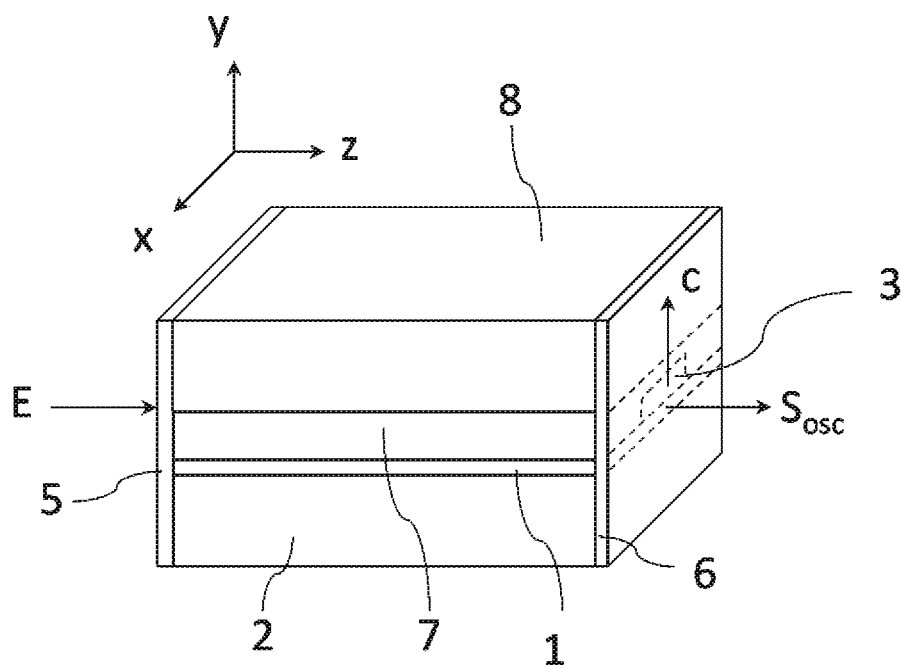
FIG. 11 is a perspective view showing an example of the structure of a ridge waveguide laser device according to Embodiment 4 of the present disclosure.

FIG. 11 is a perspective view showing a ridge waveguide laser device according to Embodiment 4 of the present disclosure.

Figure 12:
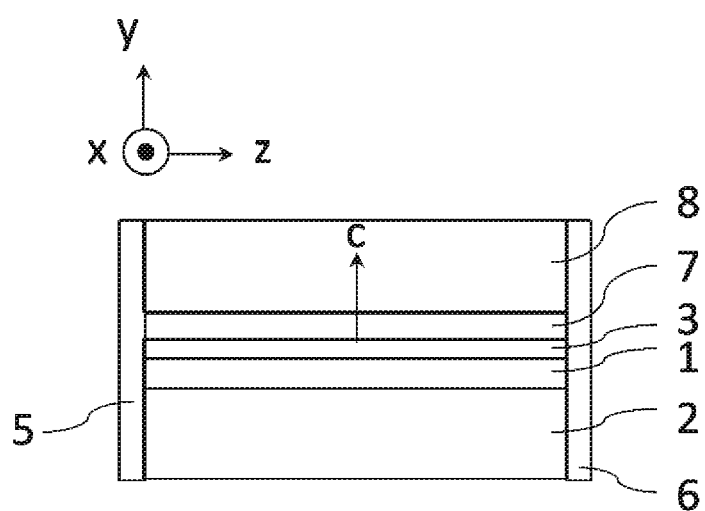
FIG. 12 is a view of a y-z plane of the ridge waveguide laser device according to Embodiment 4 of the present disclosure.

FIG. 12 is a view of a y-z plane in the ridge waveguide laser device according to Embodiment 4 of the present disclosure.

In FIGS. 11 and 12, the same reference symbols as those in FIG. 7 denote the same components or like components, and an explanation of the components will be omitted hereafter. In FIG. 11, $S_{osc}$ denotes oscillated signal light.

Next, the operation of the ridge waveguide laser device according to Embodiment 4 of the present disclosure will be explained.

Excitation light E is incident upon a core 1, and signal light is generated inside the core 1. The signal light generated inside the core 1 is reflected by coatings 5 and 6, and laser oscillation occurs when an oscillation condition given by Ineq. (4) is satisfied. Then, oscillation light $S_{osc}$ is outputted from the coating 6.

At this time, because an optical material 7 joined to a flat portion of a ridge waveguide has a refractive index between the refractive indices for ordinary and extraordinary rays of a cladding 3, either x-polarized light or y-polarized light cannot be confined in a direction of an x-axis, and therefore there occurs a difference in a propagation loss between the x-polarized light and the y-polarized light, as in the case of Embodiment 3.

Therefore, polarized light having a larger propagation loss is coupled into radiation modes, while polarized light having a smaller propagation loss is coupled waveguide modes. The polarized light in the waveguide mode is reflected by the coatings 5 and 6, laser oscillation occurs, and light is outputted from the coating 6.

As is clear from the above description, according to Embodiment 4, because by joining the optical material 7 having a refractive index between the refractive indices for ordinary and extraordinary rays of the cladding 3 to the flat portion of the ridge waveguide, a difference in the propagation loss is caused between the x-polarized light and the y-polarized light, and polarized light having a smaller propagation loss is generated, oscillation light $S_{osc}$ which is linearly polarized light can be outputted.

Although in Embodiments 1 to 4, examples in which the cladding 3 is uniaxial crystal are shown, the cladding can be biaxial crystal.

REFERENCE SIGNS LIST 1 core; 2 substrate; 3 cladding; 4a, 4b optical loss providing portion; 5 coating; 6 coating; 7 optical material; and 8 substrate.

The invention claimed is:

1. A ridge waveguide laser device comprising:
    a substrate;
    a core joined to the substrate and containing a laser medium, the core having a refractive index higher than that of the substrate; and
    a cladding joined to the core, constituting a ridge waveguide together with the core, and made from a birefringent material having ordinary and extraordinary refractive indices lower than the refractive index of the core, the ordinary and extraordinary refractive indices being different.

2. The ridge waveguide laser device according to claim 1, wherein the core has a ridge structure portion, and an optical loss providing portion for introducing a loss to light is provided to a side surface of the ridge structure portion.

3. The ridge waveguide laser device according to claim 2, wherein the optical loss providing portion is a roughened surface.

4. The ridge waveguide laser device according to claim 1, further comprising an optical material having a refractive index between the ordinary and extraordinary refractive indices and joined to a flat portion of the ridge waveguide.

5. The ridge waveguide laser device according to claim 1, further comprising:
    a reflection film joined to the core, for allowing excitation light incident upon the core to pass therethrough, while reflecting signal light generated inside the core; and
    a partial reflection film disposed opposite the reflection film and joined to the core, for reflecting the excitation light and reflecting part of the signal light.

* * * * *